United States Patent Office 3,505,096
Patented Apr. 7, 1970

3,505,096
METHOD OF PRODUCING BLUSH COATED
FABRICS OF SUPERIOR ADHESION
John L. Egitto, Belleville, N.J., Pasquale Bilello, Forest
Hills, N.Y., and Frederick H. Schwacke, Jr., Clifton,
N.J., assignors to Inmont Corporation, New York, N.Y.,
a corporation of Ohio
No Drawing. Filed May 16, 1966, Ser. No. 550,136
Int. Cl. B44d 1/44; D21h 5/00
U.S. Cl. 117—56
15 Claims

ABSTRACT OF THE DISCLOSURE

The invention is a method for making a leather-like sheet wherein a cast film of a blushable polyurethane coating is applied onto a base sheet which has previously been wetted with a non-solvent for the polyurethane. Evaporation of the volatile components of the coating produces a microporous leather-like sheet with increased adhesion between the coating and the substrate.

This invention relates to water vapor permeable coatings having a moisture vapor transmission comparable to that of leather, particularly to blush coatings, and aims to provide a new method of applying a tough breathable blush coating to a flexible porous base to produce a structure of excellent adhesion.

This invention represents an improvement of the invention covered in copending patent application Ser. No. 464,578 filed on June 16, 1965, by F. H. Schwacke et al. It is intended to incorporate the disclosure of said application into the present application by reference. The copending application is directed to a new method for producing a leather substitute having a hand, breathability, scuff resistance, temperature resistance, crease resistance, tear resistance and an appearance very similar to that of leather. The method involves coating of a porous flexible base such as woven or non-woven cotton with a blush coating of a thermoplastic polyurethane in a mixture of a solvent for said polyurethane and a non-solvent for said polyurethane, the non-solvent being less volatile than the solvent. The coating is most preferably applied as a colloidal dispersion made by cooling the blush coating composition prior to application to a temperature at which the composition assumes a milky or opalescent appearance.

It was found that despite all of the desirable properties of the coated fabric produced by the method of the copending application, the adhesion of the coating to the substrate was not completely satisfactory. I have now discovered that by an improvement in the method of making the blush coatings, I am able to increase the adhesion between the coating and the substrate and their resistance to peeling by up to five times the adhesive bond of the coatings to the substrate in the structures of the copending application.

In accordance with my improvement, the base sheet which is to be coated is first wetted with a non-solvent for the polyurethane. The blushable coating is then applied to the wet substrate after which the procedure of the copending application is followed unchanged. The blushable coating comprises a thermoplastic elastomeric polyurethane uniformly distributed in a mixture of volatile liquids including a solvent and a non-solvent for the polyurethane. The solvent and non-solvent are miscible; and the non-solvent is less volatile than the solvent. The applied coating is blushed by removing substantially all of the volatile liquids by evaporation.

The non-solvent which is used to wet the substrate need not be less volatile than the solvent for the polyurethane. Suitable non-solvents which may be used for the wetting are alkanols such as butanol, hexanol and octanol, aliphatic hydrocarbons and aromatic hydrocarbons such as xylene and benzene. One of the most desirable non-solvents because of its availability and lack of odor is water. For the sake of convenience, the non-solvent used for wetting may be the same as the non-solvent in the blushable coating composition.

The wetting is most preferably carried out by padding. Preferably, sufficient non-solvent is applied to substantially wet the substrate and most preferably to saturate the substrate. For example, when using water on a cotton sheet, sufficient water is added to increase the weight of the cotton by from about 60 to 90%. However, if the wetting is carried out by spraying one side of the substrate, an increase of at least 20% by weight is sufficient.

Without any commitment on the theory involved, it is believed that the increased adhesion is due to a more rapid and extensive precipitation of the polyurethane particles at the interface between the blushable coating and the substrate caused by the presence of the non-solvent on the substrate.

Except for the prewetting step and the components used for this step, all other components and steps are the same as in the copending application.

The blushable coating may be applied to the base as a solution of the polyurethane in the volatile liquid mixture or as a colloidal dispersion of the polyurethane in such liquid, and the term "uniformly distributed" as used herein includes the solution state and the colloidal dispersion state of the polyurethane in the liquid.

Best results are achieved if the blushable coating is applied to the substrate at an elevated temperature.

The polyurethanes used in the practice of this invention are thermoplastic elastomeric polyurethanes which are esentially linear in character. They are prepared from long chain diols such as linear polyesters and polyethers having molecular weights ranging from about 400 to 6000 and diisocyanates. The polyurethanes may also include in addition to the diols and diisocyanates, "chain-extenders" which are active hydrogen-containing difunctional compounds such as glycols, diamines, amino alcohols and water.

The polyesters used in the preparation of the polyesterurethanes are prepared from the esterification of such dicarboxylic acids as adipic, succinic, pimelic, suberic, azelaic and sebacic or their anhydrides with glycols such as ethylene glycol, butanediol-1,4, hexamethylenediol-1,6, and octamethylenediol-1,8. In general, the glycol has the formula $HO(CH_2)xOH$ with $x$ preferably from 2 to 10.

The polyethers used in the preparation of the polyetherurethanes involved in this invention may be characterized by the formulation $HO(RO)_nH$ where R is a divalent alkylene radical and $n$ is preferably a positive integer such that the molecular weight of the polyether lies between 400 and 6000. These polyethers are conventionally known as polyalkyleneether glycols or hydroxy poly (alkylene oxides). Some conventional polyethers which may be used are polyethyleneether glycol, polypropyleneether glycol, polytetramethyleneether glycol, polyhexamethyleneether glycol, polyoctamethyleneether glycol, polynonamethyleneether glycol, polydecamethyleneether glycol, polydodecamethyleneether glycol and mixtures thereof. Polyglycols containing several different radicals in the molecular chain such as, for example the compound $HO(CH_2OC_2H_4O)_nH$ wherein $n$ is an integer greater than 1 may also be used.

The solvent used in the blushable coating will depend on the polyurethane used as well as the nature of the non-solvent used since the solvent must be miscible with the non-solvent and must be more volatile than the non-solvent. Once a solvent is selected, potential non-solvents will be readily determinable by those skilled in the art of blushed coatings. Pyridine, dimethyl formamide, dimethyl sulfoxide, pyrolidones, cyclohexanone and preferably tetrahydrofuran and p-dioxane are suitable solvents for the polyesterurethanes and polyetherurethanes of patents 2,871,218 and 2,899,411 for example.

The non-solvent in the coating selected will depend on the polyurethane used and the nature of the solvent. The non-solvent must be a non-solvent for the polyurethane which is miscible with and less volatile than the solvent. While each of the following non-solvents will not be operable with each combination of solvent and polyurethane, they can be used in particular combinations: alkanols including butanol, hexanol and octanol, and aliphatic hydrocarbons particularly the aliphatic hydrocarbons with higher boiling ranges above 250° C. Of course, other non-solvents may be used, and these will be obvious to those skilled in the blushed coatings art.

While the base which we now prefer is a woven textile, non-woven textiles are utilizable. Cotton textiles have produced good results. However, any of a wide variety of natural and synthetic textiles to which the coating will adhere firmly will give satisfactory results e.g., nylon, polyesters such as Dacron materials, materials or acrylics such as Orlon, vinyl chloride copolymers, cellulosics such as rayon and cellulose acetate as well as natural materials such as cotton, wool, ramie, hemp and linen. The blushable coating is preferably applied at a wet coating thickness of from 20 to 200 mils, and most preferably at a thickness of 140–200 mils.

The polyurethanes used in this invention preferably have a molecular weight of from 5000 to 300,000 and most preferable from 40,000 to 80,000.

An additional advantage of wetting of the fabric substrate is that penetration of the blushable composition through the substrate resulting in undesirable "strike-through" is completely eliminated.

In the present specification and claims, all proportions are by weight unless otherwise set forth.

The following examples will further illustrate the practice of this invention:

EXAMPLE 1

A polyesterurethane having a molecular weight of about 60,000 is prepared following the procedure set forth in U.S. Patent 2,871,218, col. 4, lines 13 to 27. A mixture of 1447 g. (1.704 mols) of hydroxyl poly (tetramethylene adipate), molecular weight 849, hydroxyl number 130.4, acid number 0.89, and 109.6 g. (1.218 mols) of butanediol-1,4 is melted in a four liter kettle and stirred with a spiral ribbon stirrer for about 20 minutes at a pressure of 5 to 6 mm. at 100 to 110° C. To this mixture, there is added 730 g. (2.92 mols) of diphenyl methane-p,p diisocyanate. This mixture is stirred for about 1 minute and is then poured into a lubricated one gallon can which is promptly sealed with a friction top and the can placed in a 140° C. oven for 3.5 hours. The product is then cooled. A 20% solution of the polyesterurethane in p-dioxane is prepared.

Then 150 g. of the solution are heated to and maintained at 90–92° C. while 110 cc. of n-hexanol are added slowly. The solution is clear. The mixture is then slowly cooled until opalescence appears at 42° C. The opalescent composition is then cooled another 5° C. and coated at a thickness of $\frac{3}{32}$ inch onto the surface of a cotton sheet having a weight of 0.002 ounces per square inch and air-dried for a period of 16 hours at room temperature. The coated surface has a hand closely resembling that of a leather, excellent scuff and abrasion resistance and a moisture vapor transmission or breathability equal to that of leather.

The coated fabric of this invention passed 3.4 g. of water vapor in 24 hours. The M.V.T. of the fabric may be set forth as 3.4 g./10 cm.$^2$/24 hours as compared to leather which has an M.V.T. of 0.5 to 3.5 g./10 cm.$^2$/24 hours depending upon the type of leather.

Then, in order to test the adhesion of the coating to the cotton substrate, the following peel test is performed: A strip two inches in width is cut from the coated substrate and an attempt is made to peel the coating from the substrate along said two-inch width by gradually increasing the force until the coating separates from the substrate. A force of 3 lbs. applied across the two-inch width is sufficient to separate the coating from the substrate.

Then, this example is repeated using the same components, proportions, procedure and conditions except that the cotton sheet is prewetted prior to the application of the coating by padding the cotton sheet in water until its weight is increased by about 60 to 90%. The resulting coated fabric has properties substantially identical to those of the coated sheet described above except the adhesion of the coating to the cotton substrate is increased so that it requires a force of about 10 lbs. to peel the two-inch strip apart.

The example is also repeated substituting n-hexanol for water with substantially the same results except that it requires a force of about 9 lbs. to peel the strip apart.

EXAMPLE 2

40 g. of a polyetherurethane prepared from hydroxyl poly (tetramethylene oxide), diphenyl methane-p,p'-diisocyanate and butanediol-1,4 in accordance with the procedure set forth in U.S. Patent 2,899,411 Example III are dissolved in 160 g. of p-dioxane. The solution is heated to 95° C. and maintained at 90° C. to 95° C. while 57.1 g. of an alkane hydrocarbon solvent having a boiling range of 350–388° F., a K.B. value of 27 and an aniline cloud point of 184.5° F. are added over a period of 12 minutes with continuous stirring. A solution which is clear to the eye forms. The solution is cooled. At 42° C., the solution becomes opalescent. The composition is permitted to cool to 39° C. The composition is then coated at a thickness of $\frac{3}{16}$ inch onto the surface of a cotton sheet having a weight of 0.002 ounces per square inch and air-dried for a period of 16 hours at room temperature. Alternatively, the coating may be air-dried for about 1½ hours at room temperature and then for 2 hours at 65° C. After drying the coating has a thickness of about $\frac{1}{24}$ inch, a hand closely resembling that of a leather, excellent scuff and abrasion resistance and a moisture vapor transmission or breathability equal to that of leather.

The coated fabric of this example passed 1.9 g. of water vapor in 24 hours. The M.V.T. of the fabric may be set forth as 1.9 g./10 cm.$^2$/24 hours as compared to leather which has an M.V.T. of 0.5 to 3.5 g./10 cm.$^2$/24 hours depending upon the type of leather.

When the adhesion is tested by the peel test described in Example 1, the force necessary to peel the coating from the base is about 2 lbs. for the two-inch width.

However, when the example is repeated using the same components, proportions, procedure and conditions except that the cotton sheet is prewetted prior to the application of the coating by padding the cotton sheet in water until its weight is increased by about 60 to 90%, the resulting coated fabric has properties substantially identical to those of the coated sheet described above except that the adhesion of the coating to the cotton substrate is increased so that it requires a force of about 9 lbs. to peel the two-inch strip apart.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:
1. In the method of applying a water vapor permeable coating onto a porous flexible base comprising covering a surface of said base with a blushable coating comprising a thermoplastic elastomeric polyurethane uniformly distributed in a mixture of a volatile solvent for said polyurethane and a volatile liquid miscible with said solvent which liquid is a non-solvent for said polyurethane and is less volatile than said solvent and removing substantially all of the volatile mixture by evaporation, the improvement which comprises wetting said base with a non-solvent for said polyurethane prior to covering the base with said blushable coating, in an amount sufficient to increase the weight of the base by at least 20% whereby the adhesion between the coating and the base is increased.

2. The method of claim 1 wherein the polyurethane is distributed as a colloidal dispersion in the volatile mixture.

3. The method of claim 1 wherein said blushable coating is applied to said porous base at an elevated temperature.

4. The method of claim 2 wherein said blushable coating is applied to a textile substrate at an elevated temperature.

5. The method of claim 2 wherein said polyurethane is a polyesterurethane.

6. The method of claim 5 wherein said polyesterurethane is an essentially linear polyesterurethane elastomer which is the reaction product obtained by heating a mixture comprising as essential polyurethane ingredients (1) one mol of an essentially linear hydroxyl terminated polyester of a saturated aliphatic glycol having from 4 to 10 carbon atoms and having hydroxyl groups on its terminal carbon atoms and a material selected from the group consisting of a dicarboxylic acid of the formula:

HOOC—R—COOH where R is an alkylene radical containing from 2 to 8 carbon atoms and its anhydride, said polyester having an average molecular weight between 600 and 1200 and having an acid number less than 10, and (2) from 1.1 to 3.1 mols of a diphenyl diisocyanate having an isocyanate group on each phenyl nucleus in the presence of (3) from about 0.1 to 2.1 mols of a saturated aliphatic free glycol containing from 4 to 10 carbon atoms and having hydroxyl groups on its terminal carbon atoms, the molar amount of said polyester and said free glycol combined being essentially equivalent to the molar amount of said diphenyl diisocyanate whereby there are essentially no groups of the class consisting of isocyanate and hydroxyl groups in said reaction products.

7. The method of claim 6 wherein said polyesterurethane is a linear hydroxyl terminated polyester produced by the reaction of hydroxyl polytetramethylene adipate and butanediol-1,4, and said diisocyanate is diphenyl methane-p,p′ dissocyanate.

8. The method of claim 2 where in said polyurethane is a polyetherurethane.

9. The method of claim 8 wherein said polyetherurethane is the reaction product of an arylene diisocyanate and a polyalkyleneether glycol.

10. The method of claim 9 wherein said polyetherurethane is the reaction product of diphenyl methane-p,p′-diisocyanate and polytetramethyleneether glycol.

11. The method of claim 2 wherein said base is wetted with water.

12. The method of claim 2 wherein said base is wetted with the same non-solvent used in the coating composition.

13. The method of claim 2 wherein said base is a cellulose.

14. The method of claim 2, wherein said base is saturated with said solvent.

15. The method of claim 12, wherein said base is wetted with sufficient water to increase the weight of the base by from 60 to 90%.

References Cited

UNITED STATES PATENTS

| | | | |
|---|---|---|---|
| 2,150,096 | 3/1939 | Bogin | 117—105.1 |
| 2,306,525 | 12/1942 | Cummings | 117—8 |
| 2,519,660 | 8/1950 | James | 117—36.7 X |
| 2,657,151 | 10/1953 | Gensel et al. | 117—47 |
| 2,665,262 | 1/1954 | Rolle et al. | 117—36.7 X |
| 2,848,752 | 8/1958 | Bechtold | 117—36.7 X |
| 2,898,112 | 8/1959 | Flower et al. | 117—36.7 X |
| 3,031,328 | 4/1962 | Larsen | 117—36.7 X |
| 3,055,297 | 9/1962 | Leeds | 101—327 |
| 3,100,721 | 8/1963 | Holden | 117—135.5 |
| 3,180,853 | 4/1965 | Peters | 117—161 X |

WILLIAM D. MARTIN, Primary Examiner

T. G. DAVIS, Assistant Examiner

U.S. Cl. X.R.

117—47, 55, 138.8, 142, 161